Dec. 22, 1936.     A. H. DAVIS, JR     2,065,119
FLAW DETECTION
Filed June 30, 1933
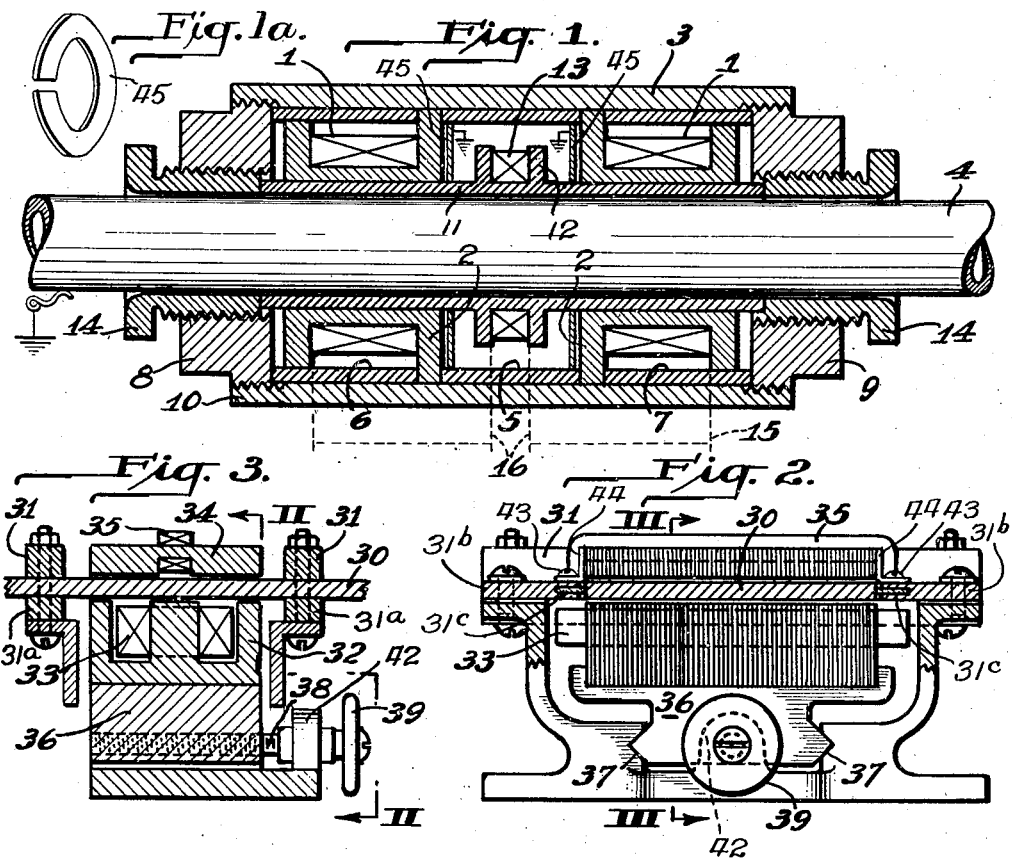
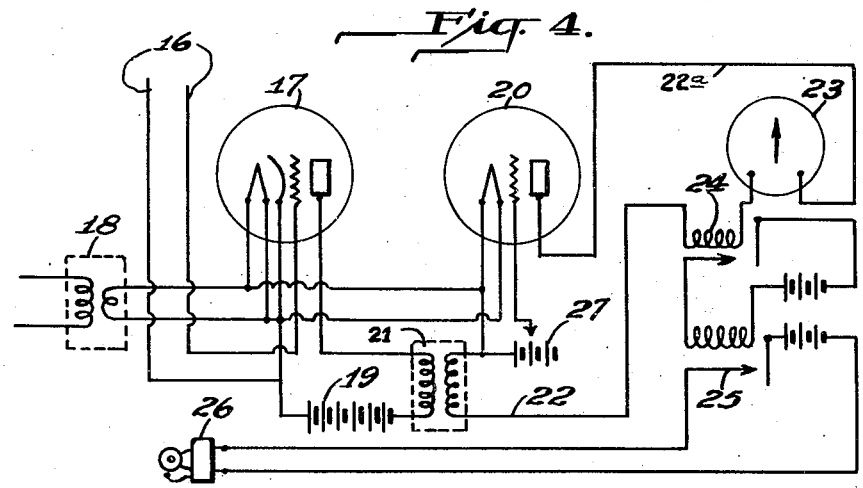
WITNESSES
INVENTOR
Archibald H. Davis, Jr.

Patented Dec. 22, 1936

2,065,119

UNITED STATES PATENT OFFICE 2,065,119

FLAW DETECTION

Archibald H. Davis, Jr., New Castle, Pa., assignor, by mesne assignments, to Steel and Tubes, Inc., Cleveland, Ohio, a corporation of Ohio Application June 30, 1933, Serial No. 678,370

11 Claims. (Cl. 175—183)

This invention relates to the testing of metallic articles, especially tubing, for location of defects therein.

Metallic articles, such as rod, bar, plate, tubing, and other forms, may contain defects which seriously affect their integrity for various uses. The art has lacked means for satisfactorily locating internal defects in non-magnetic materials. Likewise grave difficulties attend accurate and ready location of surface defects in articles having curved surfaces, such as tubing. That is, no means has been available which possesses the necessary degree of accuracy and is applicable to commercial production of the articles without unduly increasing the cost or interfering with production methods and without injuring the article.

Such defects may take various forms. For instance, the billets or ingots from which the bar, plate, tubes, etc., are made may contain non-metallic inclusions and blowholes which are elongated out longitudinally in working and which may form sources of failure. Likewise, particularly in the case of tubing, fissures may be formed, through rupture of the metal, or through the failure of folds to re-weld in subsequent drawing operations.

All such defects weaken the article and may render it totally unfit for many uses, especially in the case of tubing which is to be applied to pressure uses. Fissures and inclusions likewise form sources of failure if the article or products made therefrom are to be subjected to alternating stresses.

The magnetic methods of testing can not be adapted satisfactorily to non-ferrous materials, because of their lack of magnetic properties, or because such methods when applied to such materials inherently lack the sensitivity necessary in the detection of minor flaws, or for other reasons. The non-ferrous materials are especially susceptible to the effects of such defects, but hitherto the art has been restricted to visual methods of examination.

Visual examination can not locate hidden defects and is of little use when applied to tubing and other articles having curved surfaces. For instance, the high reflectivity of copper, aluminum and the like, combined with the curvature of the tube, makes it extremely difficult to visually locate any but the grossest defects on the exterior surface of the tube, and obviously visual examination of the bore of long tubes is substantially impossible. Moreover, as indicated hereinabove, many of the most serious defects occur internally of the tube, and whatever the form of the article such defects can not be located by visual examination.

In a copending application filed by me on August 13, 1932, Serial No. 628,677, of which the present application is a continuation in part, I have disclosed a method of and apparatus for testing non-magnetic articles for defects, according to which the article is subjected to a substantially constant alternating exciting field to induce flow of circulating currents in the article. The circulating currents flowing in the article create externally of the article a counter-magnetic field which is substantially uniform in regions free from defects. When a portion of the article containing a defect passes through the exciting field, however, the circulating currents are deflected from their normal paths, thus causing distortion of the external counter-magnetic field. In accordance with the method of my copending application the distorted portion of the field is applied to detection of the defect.

In the preferred embodiment of that invention distortion of the field is detected by means of a detecting coil which is electrically neutral as long as the counter-magnetic field is uniform, but which is affected by distortion of the counter-magnetic field to create a detecting voltage which is applied to suitable means for indicating the occurrence of the defect. Various means may be applied to that end. One of these comprises the use of two exciting coils connected in opposition with a single detector coil situated between them. In another embodiment a single exciting coil is used and two detector coils are situated uniformly in the exciting and counter-magnetic fields. These two detector coils are connected in opposition so that the voltages induced in them by the counter-magnetic field of perfect tubing will neutralize, while the distortion of the field by a defect will create a resultant voltage.

In extensive application of the method referred to I have discovered that for the best results, i. e., for the greatest sensitivity and reproducibility of the results, the detector element must be balanced with great accuracy with respect to the exciter element, so that the detector element will be substantially electrically neutral in the absence of a defect. Thus, using a single detector coil with two exciter coils, the former is partially in the field of each of the exciter coils, and each of the latter must act identically on the detector coil, for minute variations from its true electrical center will cause the detector coil to produce a relatively strong voltage and the consequent response on the indicating mechanism would indicate the presence of a defect of some substantial magnitude. Similarly, using one exciter coil and two detector coils, the latter must be electrically neutral with respect to the former for the same reason.

My tests have shown that the voltages induced by distortion of the counter-magnetic field are exceedingly minute, even with gross defects, and they may be as low as one-millionth of a volt. Thus, if the detector element is to be suitably accurate and sensitive to locate defects of varying magnitude it must be placed so accurately in the exciting field, or fields, as to avoid creation of voltage flow in the detector element due to electrical unbalancing of the detecting and exciting elements. I have found that in practice a variation of 0.0001 inch in the position of the detector element from its true electrical center in the exciting field will cause a voltage to be created in the detector coil comparable in magnitude to the voltage that would normally be set up by a defect as it passes through the field of influence of the exciting coil.

It is not possible to make coil assemblies with such a degree of electrical accuracy, even if the spools upon which the coils are wound could be made accurately with tolerances of less than one-ten-thousandths of an inch. This difficulty results from the impossibility of winding the wire on the spool so accurately that the electrical center of the coil corresponds exactly with the mechanical center of the spool.

However, my work has shown that even if the assemblies could be made with the necessary degree of accuracy, this would be insufficient, due to conditions which prevail in the use of such an apparatus. Thus, I have discovered that as the article being tested moves through the exciting field its motion tends to deflect the electrical center of the system in the direction of its travel. This must be compensated for to maintain the accuracy and sensitivity of the device. Also, such apparatus heats in use with consequent expansion of the various elements, and this causes de-centering, so that means must be provided for overcoming this factor also.

As further showing these factors and their relation to maximum sensitivity and reliability, my tests have shown that the voltage created in the detector coil by many defects are as low as one-millionth of a volt. The detector coil is situated in the field of the exciting coil, and this field might create very large voltages in the detector coil, even of the order of many hundreds of volts, and since commercially variations of the order of 1 per cent are considered low, it will be apparent that if the detector coil is not electrically centered in the field of the exciter coils, normal variations in the exciting field would cause the detector coil to produce erroneous results. Moreover, the disparity between the true defect-created voltage and that which may be due to the exciting field and normal variations thereof would preclude accurate measurement of the former. Variations in the strength of the exciting field equally alter the counter-magnetic field, and this also would induce strong variable voltages in the detector coil if this latter coil were not electrically centered in this field also. The change in strength of the countermagnetic field due to a defect is exceedingly small compared to the normal variation of strength just referred to. My centered detector coil is independent of the actual strength of the countermagnetic field but is very sensitive to any change of position of that field.

Hence, in accordance with this invention the detector coil is balanced so as to be wholly non-responsive to the primary field, and to normal variations in the counter-magnetic field in regions free from defects, while being responsive to distortion of the counter-magnetic field caused by a defect, most suitably by electrically centering the detector coil.

It is among the objects of this invention to provide an apparatus for use in testing non-magnetic metallic articles for defects, which is simple, relatively inexpensive, adjustable to the end that the detecting and exciting elements may be adjusted to and maintained in the relations just stated for attainment of the highest accuracy and sensitivity in use irrespective of the factors referred to, and which provides for high accuracy and reliability in the practice of the method disclosed in my aforesaid copending application.

The invention may be described in detail with reference to the accompanying drawings, in which Fig. 1 represents the preferred embodiment as applied particularly to the testing of tubing; Fig. 1a is a perspective view of shields used in the apparatus of Fig. 1; Fig. 2 a front elevation of a modified form of apparatus applicable to the testing of flat articles; Fig. 3 a sectional view of the apparatus shown in Fig. 2, taken on line III—III thereof; and Fig. 4 a wiring diagram showing an amplifier suitable for use with the apparatus provided by the invention.

Having reference now to Fig. 1, a pair of identical coils 1 wound on spools 2 are mounted in spaced relation and in axial alignment within a sleeve member 3 so that the article to be tested, in this case a tube 4, may be moved concentrically through the coil openings in spools 2. A spacer member 5 is mounted between the spools, and other spacer members 6 and 7 each engage a spool at one end and abut at the other end against end plugs 8 and 9, respectively, provided with screw threads 10 for engagement with similar threads cut in the ends of sleeve 3. By turning up the end plugs to exert thrust against spacers 6 and 7 the coils are held in fixed position.

A tubular member 11 extends through sleeve 3 and the openings in spools 2 and carries between coils 1 a spool 12 on which is wound a coil 13. Member 11 is mounted for axial movement to provide for accurate adjustment of its coil 13 with respect to coils 1 so as to electrically center them. This is done by means of externally threaded bushings 14 which are screwed in similarly threaded openings in end plugs 8 and 9, as shown. Bushings 14 are screwed up to contact with the ends of member 11.

In the use of the apparatus extremely accurate adjustment of coil 13 with respect to coils 1 is possible by backing off one of the bushings 14 and advancing the other. By providing the bushings with fine threads of low pitch very minute adjustments of coil 13, within the degree of accuracy necessary for the practice of the invention, is readily possible.

Coils 1 may constitute the exciting member, and coil 13 the detecting member, or by appropriately winding them, coils 1 may act as the detector element, with coil 13 as the exciting element.

Assuming that coils 1 are used as the exciting element, these coils are connected in opposition and are connected by leads 15 to a suitable source of substantially constant alternating current, such as a 500-cycle alternator. The leads from coil 13 are connected to means for ascertaining distortion of the counter-magnetic field caused by a defect in tube 4 as it moves through the apparatus. Thus terminals 16 of coil 13 may be connected to an amplifier and headphone apparatus of the type known in the art, the occurrence of the customary clicks notifying the observer that a defect is passing through the apparatus. Such a means of indicating disturbance does not give information as to the magnitude of the defect, and for this reason it is preferred to amplify the detector coil currents for quantitative measurement of the indication created by the defect. This may be done by an amplifying system used in connection with appropriate measuring or indicating apparatus.

An amplifying system suitable for use in the practice of the invention is shown in Fig. 4. It comprises an amplifier tube 17 of conventional type for receiving the current from the detector coil through its terminal leads 16. A transformer 18 supplies current for filament excitation, and the plate is supplied with current from a battery 19. Any desired number of stages, or tubes, 17, may be used to effect amplification. A single stage is shown for simplicity of illustration, although a three-stage amplifier has been found to be quite suitable. The output from the amplifier is impressed upon a rectifier tube 20 from the output transformer 21 of the last stage of the amplifier. Uni-directional current from rectifier 20, now suitably amplified, is supplied through leads 22 and 22a to an appropriate electrical indicating instrument, such as a milliammeter 23.

The output from the rectifier tube may be used also to operate an audible or visible signalling device by applying it to operate a sensitive relay 24, adapted to operate on minute currents, which in turn operates a power relay 25 to operate the signalling device, such as an alarm bell 26. Relay 25 may be applied also to actuate a device for marking the tubing in the region of the defect. Also the rectifier output may be used to actuate other devices, e. g., recording means, such as one for tracing a graph showing the variations in the voltage from the detector element, or sorting devices for rejecting defective material.

In the amplifier system shown particularly desirable results attend the use of a grid bias on the rectifier tube, such as a source of adjustable potential 27. By altering the bias on the grid the sensitivity of the apparatus may be varied widely.

The extent of the indication given will depend upon the magnitude of the defect. That is, a slight defect will cause a slightly unbalanced condition of the detector coil, while a defect of great magnitude will cause a much larger potential to be generated in the detector coil, thus giving a greater indication. This, then, affords means for determination of the relative magnitude of the defect.

By suitably adjusting the coils to be electrically centered when the device is in operation, as described hereinabove, the device may be caused to indicate satisfactorily the most minute defect in the tube, and its operation is not affected by operating factors such as those previously referred to. Actual tests have shown that a substantial and accurately measurable indication may be had from even a very faint prick punch indentation in the surface of the tube. For many purposes it will not be essential to locate extremely minute defects, it being necessary only to determine those which would render the article unfit for its intended use, e. g., such as would cause failure under the pressures to which the article is to be subjected. For such purposes the amplifier system can be adjusted to give an indication only with defects in excess of the critical size, the visible or audible indicators, or other devices used with the amplifier system, being suitably adjusted to operate only under similar conditions.

Such critical values may be determined readily by measuring the magnitude of the voltage generated by a defect, removing that portion of the article, and testing it by appropriate means. This is repeated with defects of varying magnitude, until the values given by defects of various magnitudes have been found. Based upon the tests of the removed portions the values for serious defects are obtained, and the system may then be adjusted to indicate only defects which cause currents in excess of the critical values. It is particularly to such an adjustment of the sensitivity of the device that the application of voltage bias to the rectifier grid applies. By appropriately changing the bias voltage the sensitivity of the device can be altered to indicate extremely minute defects, or to indicate only defects in excess of some selected magnitude.

Another embodiment of the invention applicable particularly to testing of flat surfaced articles is shown in Figs. 2 and 3. The article to be tested, such as a plate 30, is passed through the device at a substantially uniform speed, being held in correct position by transversely extending top and bottom guide blocks 31 and 31a respectively, and at the sides by side guides 31b. Guides 31 and 31a are of metal as illustrated but may be of insulating material while the side guides 31b are preferably kept from contact with the plate or strip 30 being tested by spacing strips 31c, preferably of insulating material, which are supported in the guides 31b (see Fig. 2). Beneath the article is an exciting element built up from a magnetic core 32 formed of E-shaped iron laminations, and an exciting coil 33 disposed between the arms of the laminations. Directly above the exciting element, but on the opposite side of the article being tested, is another laminated core 34, of I-shape, having a central notch in which there is disposed a detecting coil 35. The exciting element is adjustable with respect to the detecting element, and in the embodiment shown is carried upon a supporting member 36 slidably mounted in ways 37 and slidably actuated by a screw 38 and handwheel 39 for adjusting the position of the exciting element so as to balance the magnetic flux passing through article 30 so that no voltage is induced in detector coil 35 when perfect material is passing through the device. Adjusting screw 38 extends forwardly through the front frame member 42 and is rotatably supported thereby. By reference to Figure 3 it will be seen that turning screw 38 by means of the hand wheel 39 will shift the member 36 thus changing the position of the coil 33 relative to the coil 35, which latter is held in fixed position by arms or brackets 44 connected to the longitudinal guide members 31b by means of screws 43.

The exciter coil 33 and detector coil 35 are connected respectively, as described hereinabove, to a suitable source of alternating current and appropriate indicating means. The device being appropriately centered electrically, coil 33 induces circulating currents in article 30, and as long as the flow of the induced currents is unobstructed by a defect there is no voltage induced in the detector coil. But upon the occurrence of a defect the flow of currents in article 30 will be deviated and a certain amount of flux will pass through the detector coil, thereby generating a voltage which is amplified and detected as indicated hereinabove. A device such as that just shown and described has been used satisfactorily for locating defects in brass and copper bars up to one inch in thickness.

In some instances it may be desirable to shield the detector element from the exciting element, to reduce the effect of electrostatic coupling between the exciter and detector coils. This may be done by placing split disc shields, Figures 1 and 1a, against the inner faces of spools 2, these shields and the tube 4 being grounded as shown in Figure 1. These shields may be of metal foil if desired. This has the additional advantage that the effect of variation in centering between the tube being tested and the detector coil is practically eliminated. That is, it is thereby possible to provide a reasonable clearance between the coil spools and the tubing to allow for minor irregularities in roundness of the tube without disturbing the operation of the device.

The same result is attained to a large degree through the construction of the apparatus shown in Figs. 2 and 3, wherein the article being tested acts as a shield between the exciting and detecting coils. The latter form of apparatus also is advantageous in that with the detector coil on the side of the article opposite the exciting coil there is uniform response to a defect to a certain magnitude regardless of whether this defect is near one surface or the other of the article being tested. In the case of thick material, particularly plates, this is a matter of material importance.

In the use of the apparatus embodied in this invention exact centering through the adjustment provided may be ascertained according to any appropriate manner. One suitable means of doing this is through the use of recording apparatus for tracing a graph of the voltage induced in the detector coil as a given article is passed through the apparatus. When that has been done the article is turned end for end and the graph drawn is likewise reversed, and the article is again passed through the apparatus, tracing another graph. When the coils are accurately centered electrically the two graphs will be mirror images of one another.

According to the provisions of the patent statutes I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. An apparatus for testing a metallic article for defects, comprising an exciting coil arranged for passage through its field of the article to be tested, a detector coil arranged to lie in the field of said exciting coil and in the counter-magnetic field set up externally of the article by the circulating currents induced in the article by said exciting coil, electrical means connected to said detector coil for indicating distortion of said counter-magnetic field caused by a defect in the article as it passes through the fields of said coils, and means adapted to render said detector coil non-responsive to the primary field of the exciting coil and non-responsive to normal variations in said counter-magnetic field in regions of the article free from defects, while being responsive to said distortion of the counter-magnetic field caused by a defect.

2. An apparatus for testing a metallic article for defects, comprising an exciting coil arranged for passage through its field of the article to be tested, a detector coil arranged to lie in the field of said exicting coil and in the counter-magnetic field set up by the circulating currents induced in the article by said exciting coil, electrical means connected to said detector coil for indicating distortion of said counter-magnetic field caused by a defect in the article as it passes through the fields of said coils, and adjusting means associated with one of said coils for moving it relative to the other to exactly center the detector coil electrically with respect to said exciting coil.

3. An apparatus for testing a metallic article for defects, comprising an exciting coil arranged for passage through its field of the article to be tested, a detector coil arranged to lie in the field of said exciting coil and in the counter-magnetic field set up by the circulating currents induced in the article by said exciting coil, electrical means connected to said detector coil for indicating distortion of said counter-magnetic field caused by a defect in the article as it passes through said detector coil, means for shielding said coils from one another to prevent electrostatic coupling, and adjusting means associated with one of said coils for moving it relative to the other to exactly center the detector coil electrically with respect to said exciting coil.

4. An apparatus for testing a metallic article for defects, comprising an exciting coil, a detector coil arranged to lie in the field of said exciting coil and in the counter-magnetic field set up by the circulating currents induced in the article by said exciting coil, said detector coil being arranged for passage therethrough of the article to be tested, electrical means connected to said detector coil for indicating distortion of said counter-magnetic field caused by a defect in the article as it passes through said coils and adjusting means associated with one of said coils for moving it relative to the other to exactly center the detector coil electrically with respect to said exciting coil.

5. An apparatus for testing a metallic article for defects, comprising an exciting coil arranged for passage through its field of the article to be tested, a detector coil arranged to lie on the side of the article opposite the exciting coil in the field of said exciting coil and in the counter-magnetic field set up externally of the article by the circulating currents induced in the article by said exciting coil, electrical means connected to said detector coil for indicating distortion of said counter-magnetic field caused by a defect in the article as it passes through said detector coil and adjusting means associated with one of said coils for moving it relative to the other to exactly center the detector coil electrically with respect to said exciting coil.

6. An apparatus for testing tubing for defects, comprising an exciting coil, a detector coil arranged to lie in the field of said exciting coil and in the counter-magnetic field set up externally of the tube by the circulating currents induced in the tube by said exciting coil, said detector coil being arranged for passage of the tube concentrically therethrough, electrical means connected to said detector coil for indicating distortion of said counter-magnetic field caused by a defect in the tube as it passes through the fields of said coils and adjusting means associated with one of said coils for moving it relative to the other to exactly center the detector coil electrically with respect to said exciting coil.

7. An apparatus for testing tubing for defects, comprising an exciting coil, a detector coil disposed in the field of said exciting coil, said detector coil being arranged for passage concentrically therethrough of the tube to be tested, electrical means connected to said detector coil for indicating distortion by a defect of the counter-magnetic field created in the tube by the circulating currents induced in the tube by said exciting coil and adjusting means associated with said coils or moving them relative to each other to exactly center the detector coil electrically with respect to said exciting coil.

8. An apparatus for testing tubes and rods for defects, comprising a sleeve, a coil member including a pair of substantially identical coils connected in opposition and aligned in spaced substantially fixed relation within said sleeve, a tubular member extending concentrically through said oppositely connected coils, a second coil member consisting of a single coil carried by said tubular member between and in axial alignment with the coils of the first-named coil member, for passage concentrically through it of the tube to be tested, said tubular member acting as a surrounding guide for the tube to be tested, one of said coil members being connected to a source of alternating exciting current, and the other of said coil members being connected to electrical means for indicating the occurrence of a defect in the tube, and means associated with said tubular member and sleeve for adjusting said tubular member longitudinally to shift the position of said second coil member relative to said first-named coil member to exactly center it with respect thereto.

9. An apparatus for testing tubes and rods for defects, comprising a sleeve, a coil member including a pair of substantially electrically identical coils connected in opposition and aligned in spaced relation within said sleeve, spacer members disposed between said coils and at the outer ends thereof, screw plugs threaded in the ends of said sleeve abutting against the outer spacer members to hold said coils in fixed position, a tubular member extending concentrically through said coils, threaded bushings disposed in said plugs concentric to said coils for contact with said tubular member, a second coil member carried by said tubular member between and concentric to said oppositely connected coils, said tubular member acting as a surrounding guide for the tube to be tested and being longitudinally adjustable by movement of said bushings to shift said second-named coil member relative to said oppositely connected coils to exactly center it with respect thereto, and one of said coil members being connected to a source of alternating exciting current, and the other of said coil members being connected to electrical means for indicating the occurrence of a defect in the tube.

10. An apparatus for locating defects in a metallic article comprising an exciting coil member arranged for passage through its field of the article to be tested and adapted to be connected to a source of substantially constant high-frequency alternating current, a detector coil member arranged in the field of said induction coil and in the counter-magnetic field set up externally of the article by the circulating currents induced in the article by said induction current and being electrically neutral in regions free from defects, electrical means connected to said detector coil for indicating unbalancing therein due to the distorted portion of said counter-magnetic field caused by a defect as the defect moves through said exciting coil field, and adjusting means associated with one of said coil members for moving it relative to the other to electrically center the detector coil to be neutral in regions free from defects.

11. An apparatus for locating defects in a metallic article, comprising an exciting member including a pair of spaced aligned induction coils connected in opposition for passage through their fields of the article to be tested and adapted to be connected to a source of substantially constant high-frequency current, means for the exposure of the article to said fields causing circulating currents to be set up in the article creative of a counter-magnetic field external to the article, a detector coil member arranged symmetrically in said exciting fields, the portions of said exciting fields threading said detector coil neutralizing each other in regions free from defects, and electrical indicating means operatively connected to said detector coil for actuation thereby, said counter-magnetic field being symmetrical in regions free from defects and the occurrence of a defect causing distortion of the counter-magnetic field and causing said detector coil to become electrically unbalanced and create a voltage which actuates said indicating means to show the presence of the defect, and means associated with one of said members for adjusting it relative to the other to electrically center the detector coil with respect to said normal exciting field.

ARCHIBALD H. DAVIS, Jr.

CERTIFICATE OF CORRECTION.

Patent No. 2,065,119. December 22, 1936.

ARCHIBALD H. DAVIS, JR.

It is hereby certified that error appears in the printed specification of the above numbered patent requiring correction as follows: Page 5, first column, line 19, claim 7, for the word "or" read for; and that the said Letters Patent should be read with this correction therein that the same may conform to the record of the case in the Patent Office.

Signed and sealed this 23rd day of February, A. D. 1937.

(Seal)

Henry Van Arsdale
Acting Commissioner of Patents.